United States Patent [19]
Weigert et al.

[11] Patent Number: 5,164,607
[45] Date of Patent: Nov. 17, 1992

[54] FILL SENSOR FOR PAINT GUN USED IN AN ELECTRICALLY ISOLATED AREA

[75] Inventors: Norman J. Weigert, Whitby; Ron J. Genereaux, Oshawa; Ronny Meuleman, Whitby, all of Canada

[73] Assignee: General Motors of Canada Limited, Oshawa, Canada

[21] Appl. No.: 719,719

[22] Filed: Jun. 25, 1991

[51] Int. Cl.⁵ .................... G01N 15/06; G01N 21/49; G01N 21/85
[52] U.S. Cl. .................. 250/577; 250/222.1
[58] Field of Search .............. 250/222.1, 573, 577; 340/555–557; 73/863.01, 863.02

[56] References Cited

U.S. PATENT DOCUMENTS

| | | | |
|---|---|---|---|
| 3,908,441 | 9/1975 | Virloget | 250/577 |
| 4,106,671 | 8/1978 | Sharples | 250/577 |
| 4,223,231 | 9/1980 | Sugiyama | 250/577 |
| 4,299,495 | 11/1981 | Sawakata et al. | 250/573 |
| 4,396,911 | 8/1983 | Motsinger et al. | 250/577 |

Primary Examiner—David C. Nelms
Assistant Examiner—S. Allen
Attorney, Agent, or Firm—Robert M. Sigler

[57] ABSTRACT

A fill sensor for a paint gun provides a light sensor opposite a light source in a housing surrounding a transparent portion of paint gun overflow line so that reception by the light sensor of light radiated from the light source through the transparent portion of the overflow line is blocked when the paint gun is filled and the paint enters the overflow line, as indicated by a change from a first signal to a second signal from an electric circuit including the light snesor. A preferred embodiment of the invention uses a CdSe₄ photo-resistor with a large aperture which is not blocked by small objects in the transparent portion of the overflow line and has a comparatively slow response for inherent signal low pass filtering. The electric circuit is adapted to operate through an intrinsically safe barrier for use in a manufacturing environment.

4 Claims, 2 Drawing Sheets

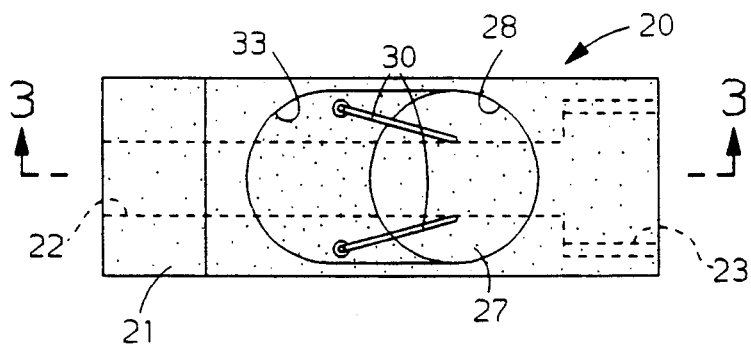
FIG. 2
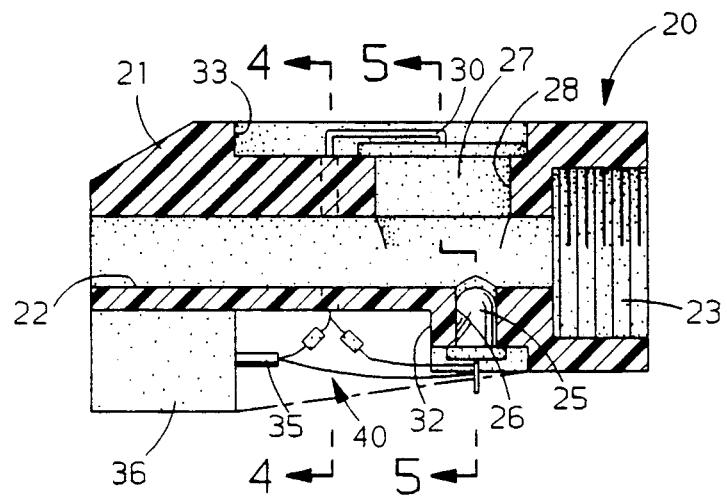
FIG. 3
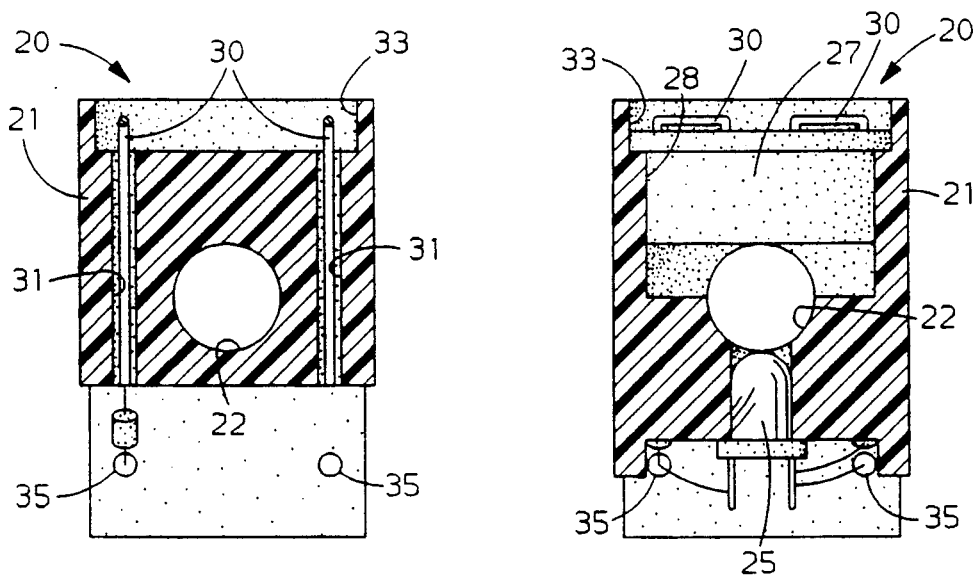
FIG. 4
FIG. 5

FILL SENSOR FOR PAINT GUN USED IN AN ELECTRICALLY ISOLATED AREA

BACKGROUND OF THE INVENTION

This invention is a fill sensor for a paint gun such as those used in multi-color robotic paint systems on vehicle body finish lines. Robotic paint systems using automatic color changers are generally required to make frequent color changes. When a color change takes place, the paint gun is first flushed with a solvent to purge all traces of the former paint color; and the paint supply line and gun must then be refilled with paint of the new color. If the supply line and paint gun are not completely clear of solvent and full of the new paint, the initial paint to be sprayed will not be uniform, and the next paint job will be unacceptable. Therefore, sufficient paint must be introduced to the paint gun to completely purge the solvent and fill the gun with paint of the new color. When the gun is full, however, additional paint is dumped through the overflow line and is wasted. Since it is clearly desirable to minimize this waste while ensuring good paint jobs, it is important to know as accurately as possible when the paint gun is full of paint.

The usual prior art practice when introducing a new color into the supply line and paint gun has been to rely on a timer to indicate when sufficient paint has been added to completely fill the supply line and paint gun. However, short and long term fluctuations in the variables that affect actual fill time force the timer to be set for a longer time that prevents an incomplete fill in the worst case, at the cost of wasted paint at other times. A paint fill sensor responsive to an actual filled supply line and paint gun would significantly reduce or eliminate such waste, while still ensuring a proper fill.

SUMMARY OF THE INVENTION

The paint fill sensor of this invention provides a light sensor opposite a light source in a housing surrounding a transparent portion of the overflow or dump line adjacent the paint gun so that reception by the light sensor of light radiated from the light source through the transparent portion of the overflow line is blocked when the paint gun is filled and the paint enters the overflow line, as indicated by a change from a first signal to a second signal from an electric circuit including the light sensor. A preferred embodiment of the invention uses a CdSe4 photo-resistor with a large aperture which is not blocked by small objects in the transparent portion of the overflow line and has a comparatively slow response for inherent signal low pass filtering. The electric circuit is adapted to operate through an intrinsically safe barrier for use in a manufacturing environment; and the low resistance of the photo-resistor in light allows the light source and photo-resistor to be energized in parallel on the protected side of the intrinsically safe barrier while the electric power source and a current responsive switch device are disposed on the other side of the barrier.

SUMMARY OF THE DRAWINGS

FIG. 2 shows a top view of a portion of the fill sensor of FIG. 1.

FIG. 3 shows a section view along lines 3—3 in FIG. 2.

FIGS. 4 and 5 are section views along lines 4—4 and 5—5, respectively, in FIG. 3.

DESCRIPTION OF THE PREFERRED EMBODIMENT

Figure 1:
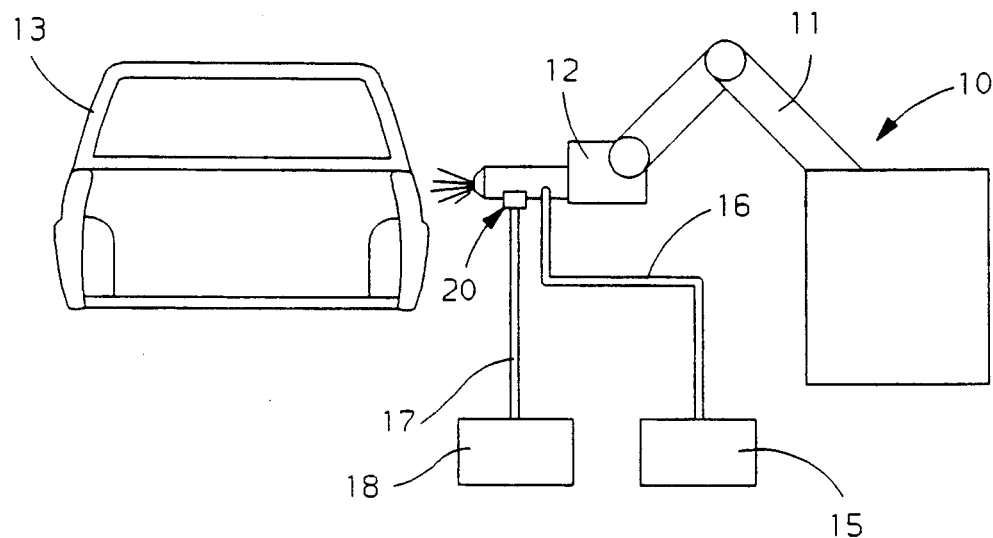
FIG. 1 shows a robotic spray paint apparatus with a fill sensor according to the invention.

Referring to FIG. 1, a multi-color robotic paint system includes a robot 10 with a maneuverable arm 11 holding a paint gun 12 for applying paint to a motor vehicle body 13. A source 15 of several selectable colors of paint and solvent is connected by a supply line 16 to gun 12 for supplying paint or solvent thereto. An overflow or dump line 17 connects gun 12 to an excess paint sump 18. Such apparatus is well known to those familiar with the painting of motor vehicle bodies.

The apparatus of this invention modifies the conventional multi-color robotic paint system as described above by adding a fill sensor 20 to overflow line 17 adjacent paint gun 12. Fill sensor 20, as shown in FIGS. 2-5, comprises a housing 21 having a central opening 22 therethrough. A transparent portion of overflow line 17 extends through opening 22. A radially larger end 23 of opening 22 is internally threaded to engage a standard compression fitting device, not shown, so that housing 21 may be locked to overflow line 17 at a desired location and housing 21 may thus be disposed around overflow line 17 adjacent paint gun 12. An LED 25 is disposed in a side opening 26 which intersects central opening 22 so that the light emitted therefrom is directed through the transparent portion of overflow line 17. Diametrically opposite LED 25, a photo-resistor 27 is disposed in a side opening 28 of housing 21 also intersecting central opening 22. Photo-resistor 27 receives and senses the light from LED 25 when it is not blocked by paint within the transparent portion of overflow line 17 but does not receive and sense such light when the transparent portion of overflow line 17 between side openings 26 and 28 is filled with paint. The leads 30 of photo-resistor 27 are directed through openings 31 to an open volume 32 in the opposite side of housing 21, where they are connected in an electrical circuit 40 with LED 25 and other elements including terminal 35 of terminal block 36 for external connection. Additional elements of circuit 40 may be connected directly by soldering, as shown, or on a printed circuit board. Volume 32 may be filled with an epoxy potting material, as may a similar volume 33 behind photo-resistor 27, through which leads 30 of photo-resistor 27 pass on the way to openings 31. Use of a clear epoxy for this purpose allows the light from LED 25 to be seen as an external check that the circuit is correctly wired and operating.

Figure 6:
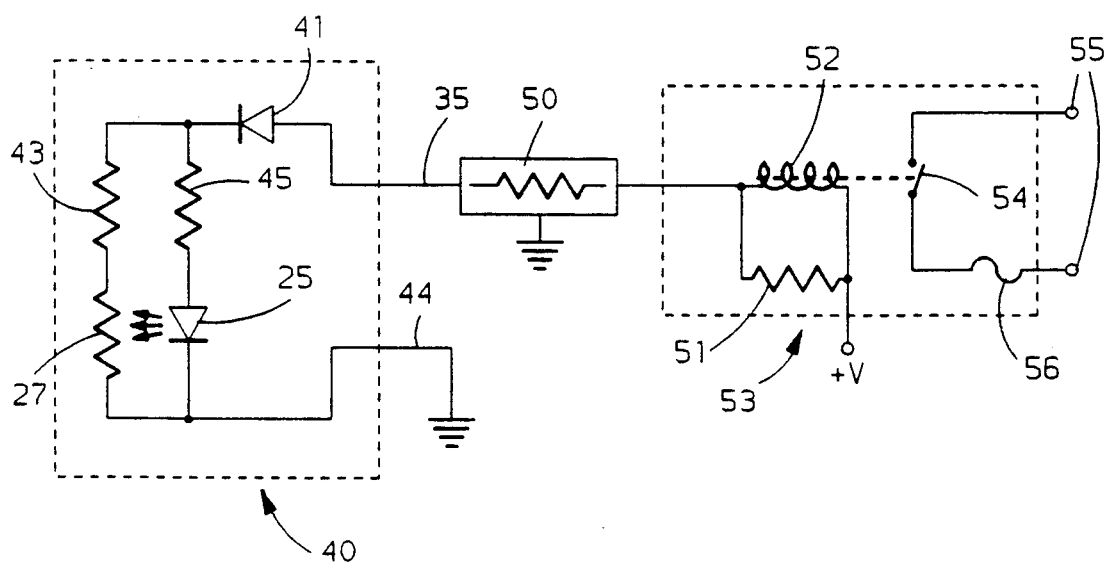
FIG. 6 is an electrical circuit diagram for the fill sensor of FIGS. 1-5.

The elements comprising circuit 40, along with other elements comprising an energizing and sensing circuit therefore, are shown in FIG. 6. A diode 41 is connected from input terminal 35 through a resistor 43 (680 ohm) and photo-resistor 27 in series to a ground line 44. A resistor 45 (2.2K) and LED 25 in series are connected in parallel with resistor 43 and photo-resistor 27. These devices comprise circuit 40, which is electrically energized through an intrinsically safe barrier 50, a protected side of which is connected to input terminal 35. An electrical power source at a voltage $+V$ (24 volts) is connected through a resistor 51 (1K), in parallel with an activating element, such as coil 52, of a relay 53 to the other side of intrinsically safe barrier 50. Relay 53 further comprises an activated switch, such as armature and contacts 54, connected in series with output terminals 55 and an internal fuse 56. Relay 53 is shown as a conventional relay for convenience; but it may comprise a solid state relay, in which coil 52 is replaced by an LED or similar light emitting semiconductor element and armature and contacts 54 are replaced by a light sensitive semiconductor switch optically coupled to the LED which replaces coil 52. Relay 53 may be basically any switch responsive to a predetermined electrical current and providing electrical isolation between the activating current carrying elements and the switched elements.

In operation, with overflow line 17 having been flushed essentially clear of paint, photo-resistor 27 senses light from LED 25 through the transparent portion of overflow line 17 and exhibits a resistance of about 1.5K. The total series resistance of resistor 43 and the illuminated photo-resistor 27 is about 2.2K; and this is in parallel with a similar 2.2K total series resistance of resistor 45 and LED 25. Thus, the total effective resistance of sensor circuit 40 is about 1.1K. This resistance is in series with the equivalent 280 ohms of intrinsically safe barrier 50 and about 600 ohms of the parallel combination of resistor 51 and the activating element 52 of solid state relay 53; and the current through relay activating element 53 is sufficient to close switch 54 so that essentially zero resistance appears across terminals 55.

However, when the transparent portion of overflow line 17 between photo-resistor 27 and LED 25 becomes filled with paint, the resistance of photo-transistor 27 increases to about 400K, which is essentially an open circuit compared to the parallel current path through resistor 45 and LED 25. The equivalent resistance of sensor circuit 40 is thus increased to 2.2K. The current through activating element 52 of relay 53 is thus decreased to open switch 54 so that an essentially infinite resistance appears across terminals 55.

Photo-resistor 27 is responsive to light at the red and infrared end of the spectrum; and LED 25 is chosen to provide light of the appropriate frequencies. The $CdSe_4$ cell chosen for photo-resistor 27 is characterized by a very low resistance in the presence of light as compared with other photo-resistors. This is advantageous in the circuit design, since it allows photo-resistor 27 and LED 25 to be energized from the same voltage in parallel paths. The 75-100K resistance of other photo-resistors would require a similar resistance to be placed in the parallel current path of LED 25 in order for any significant change to be detected between light reception and light blockage. However, such a high resistance in series with LED 25 would allow insufficient current for it to produce the required light.

Photo-resistor 27 is further provided with a large aperture (0.43 inch diameter) through which to sense the light from LED 25, so that it cannot be blocked by isolated small objects or particles in the overflow line between photo-resistor 27 and LED 25. The $CdSe_4$ cell also has a comparatively slow response time (0.25 seconds), so that photo-resistor 27 has a built-in low pass filtering effect. The sensor is thus essentially insensitive to small particles and clumps of paint left by an incomplete purge between paint jobs. It will essentially respond only to a complete fill of the overflow line between photo-resistor 27 and LED 25.

Intrinsically safe barrier 50 is an electrical system well known in manufacturing which electrically isolates and protects an area in which no electric sparks are desired. It allows electrical power to be introduced into the protected area but limits power, current and voltage to levels preventing such electric sparks. In the circuit of FIG. 6, it appears as an equivalent 280 ohm resistance. The circuit of FIG. 6 is designed so that relay 53, while being located physically and electrically outside the protected area, is nevertheless responsive to the resistance of photo-resistor 27 located on the opposite side of intrinsically safe barrier 50 within the protected area. This is accomplished by the voltage divider comprising resistor 51, intrinsically safe barrier 50, resistor 43 and photo-resistor 27 in series across voltage $+V$. Although photo-resistor 27 is in the protected area, changes in its resistance nevertheless affect the voltage across resistor 51 and thus the current through the activating element 52 of relay 53. The voltage divider also reduces the voltage on the protected side of intrinsically safe barrier 50. The use of the low resistance $CdSe_4$ photo-resistor 27, as described above, allows LED 25 to also be located on the protected side of intrinsically safe barrier 50 electrically in parallel with photo-resistor 27.

The embodiments of the invention in which an exclusive property or privilege is claimed are defined as follows:

1. A fill sensor for a paint gun for use in an electrically isolated area of a manufacturing facility, the paint gun having a supply line from a source of liquid paint and an overflow line for disposal of excess paint having a transparent portion, the fill sensor comprising, in combination:
   a housing surrounding the transparent portion of the overflow line;
   a light source in the housing on one side of the transparent portion of the overflow line;
   a light sensor in the housing on another side of the transparent portion of the overflow line opposite the light source to detect radiation therefrom when the radiation is not blocked by paint in the transparent portion of the overflow line therebetween;
   a source of electric power and relay outside the electrically isolated area, the relay having an activating coil connected in series with the source of electric power and an armature activating a signaling device;
   a conductor connecting the source of electric power and activating coil outside the electrically isolated area with the light source and light sensor connected electrically in parallel within the electrically isolated area; and
   circuit means responsive to the light sensor receiving light from the light source while the transparent portion of the overflow line is not filled with paint for decreasing the electrical resistance in series with the activating coil to activate the relay and thereby provide a first signal from the signaling device and responsive to the light sensor not receiving light from the light source while the transparent portion of the overflow line is filled with paint for increasing the electrical resistance in series with the activating coil and thereby provide a second signal from the signaling device.

2. The fill sensor of claim 1 in which the light sensor comprises a $CdSe_4$ light sensitive resistor having an aperture large compared with isolated objects in the overflow line and a low resistance when exposed to light.

3. The fill sensor of claim 1 in which the conductor crosses an intrinsically safe barrier separating the electrically isolated area from the remainder of the manufacturing facility.

4. The fill sensor of claim 3 in which the light source is an LED, a first resistor is connected in parallel with the activating coil, a second resistor is connected in series with the light source and a third resistor is connected in series with the light sensor.

* * * * *